April 3, 1951  R. L. BEEKMAN  2,547,616
INDEXING TURRET TOOL POST
Filed March 8, 1946  5 Sheets-Sheet 1
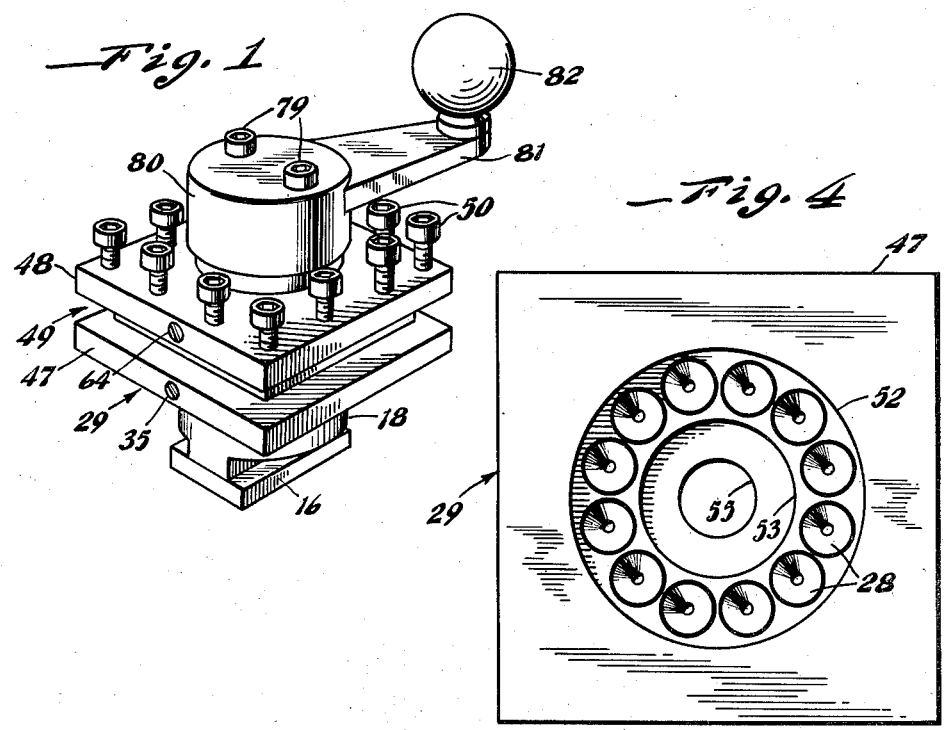
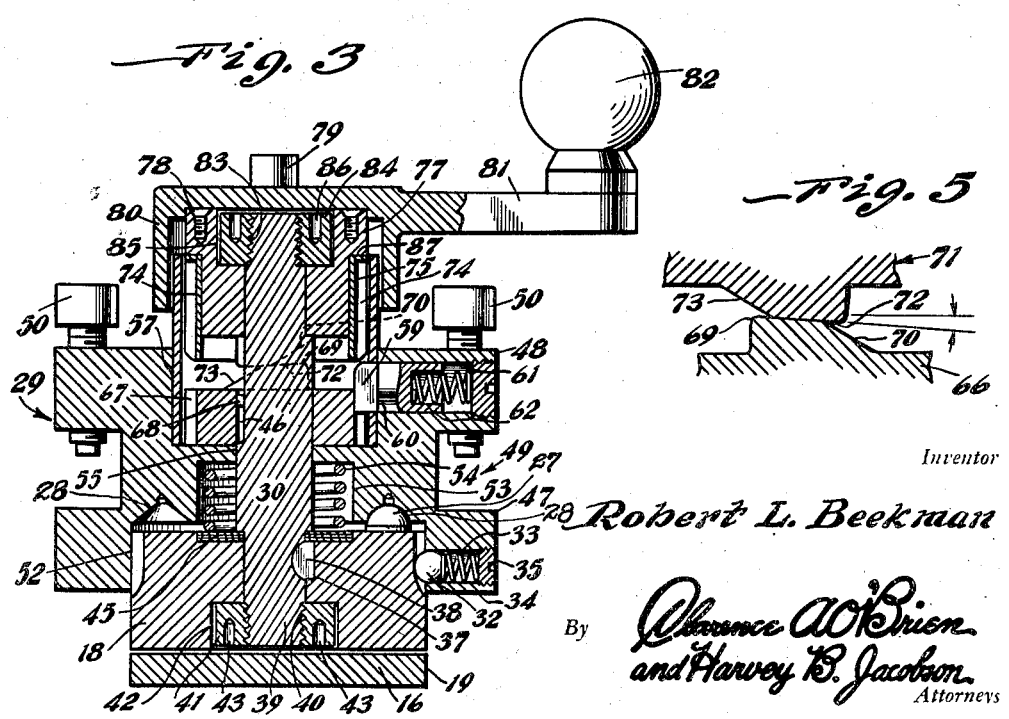
Inventor
Robert L. Beekman
By Clarence A. O'Brien
and Harvey B. Jacobson
Attorneys April 3, 1951

R. L. BEEKMAN 2,547,616

INDEXING TURRET TOOL POST

Filed March 8, 1946

Inventor

Robert L. Beekman

By Clarence A. O'Brien
and Harvey B. Jackson
Attorneys

April 3, 1951 R. L. BEEKMAN 2,547,616
INDEXING TURRET TOOL POST
Filed March 8, 1946 5 Sheets-Sheet 3
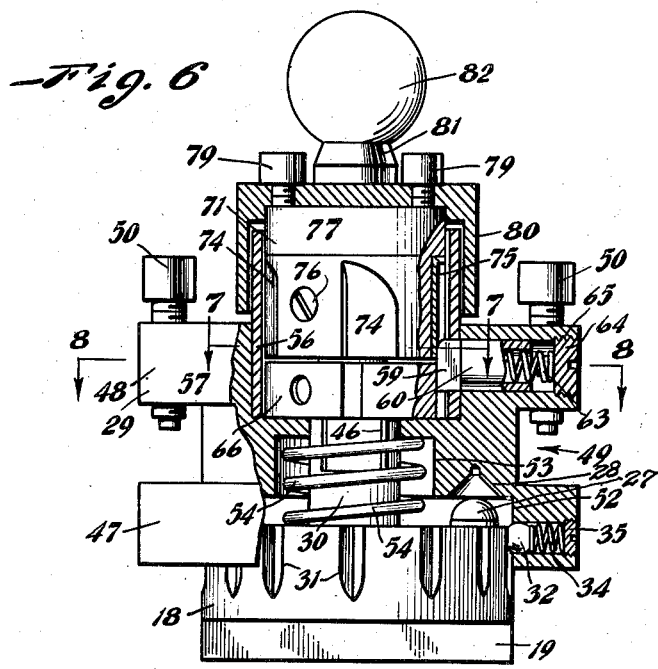
Inventor
Robert L. Beekman
By Clarence A. O'Brien
and Harvey B. Jacobson
Attorneys April 3, 1951 R. L. BEEKMAN 2,547,616
INDEXING TURRET TOOL POST
Filed March 8, 1946 5 Sheets-Sheet 4
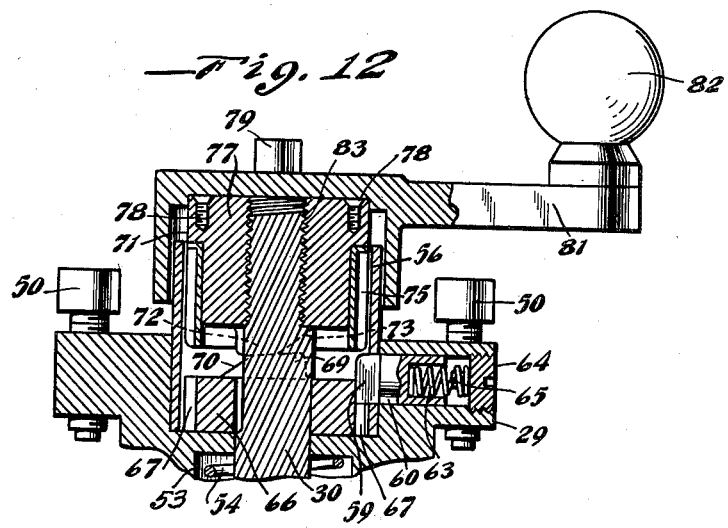
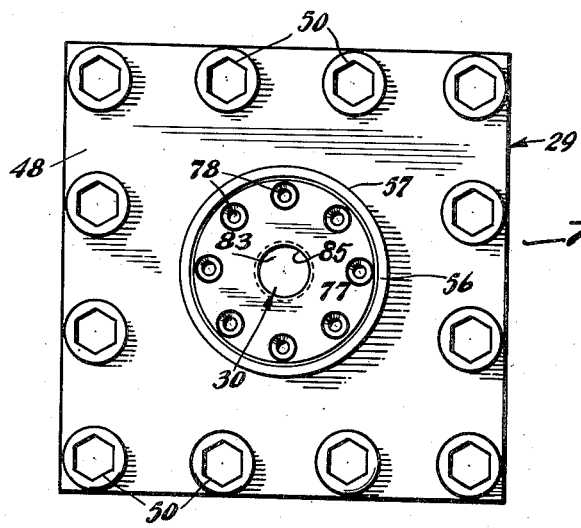
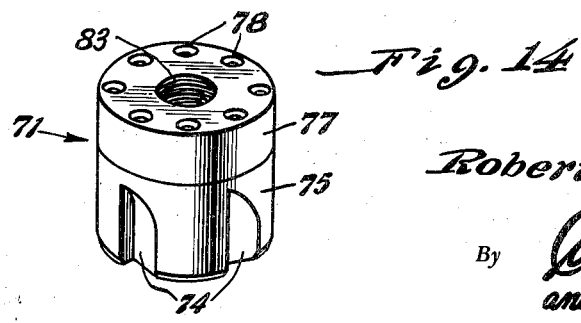
Inventor
Robert L. Beekman
By Clarence A. O'Brien
and Harvey B. Jacobson
Attorneys Patented Apr. 3, 1951

2,547,616

UNITED STATES PATENT OFFICE 2,547,616

INDEXING TURRET TOOL POST

Robert L. Beekman, Fort Lauderdale, Fla.

Application March 8, 1946, Serial No. 652,982

10 Claims. (Cl. 29—49)

This invention relates to an indexing turret tool post for adjusting or indexing and locating tools relative to work on lathes and like machines.

The primary object of the invention is to provide a tool post, particularly for lathes, turret lathes and the like, which may be turned or set at any one of a number of positions, that is, a plurality constituting a multiple of the holding and seating means, so that rotation of the adjusting and clamping handle of the device by a single turn in a counter-clockwise direction and return in a clockwise direction, will automatically shift the tool turret post or block for the desired degree of rotational adjustment so as to effectively position the tools with respect to the work in any one of said plurality of positions with extreme accuracy in the indexing to minute tolerance and without appreciable deviation due to wear, which is taken care of by hardening the parts which co-act to take the pressure and stresses in use in any one of the indexing positions of the device and at any angle desired so as to insure positively accurate repetitive operations in a simple and efficient manner, thereby expediting and insuring the highest efficiency and accuracy in the work.

Another and important object of the invention is to provide novel means for supporting the turret block with the tools or tool holders held therein, firmly and accurately on a multiple or three-point suspension which will prevent wabbling or unsteadiness thereof and which by reason of being hardened at the co-acting supporting surfaces, will result in a minimum of wear, thereby insuring extreme accuracy in the angular adjustment of the tool block to different radial positions for the use of the various tools at different angles in operating upon the work as the tools are successively changed in the progressive steps of operation upon the work.

Another object of the invention is to provide a novel construction of indexing turret tool post having simple and novel means for releasing and disengaging the holding means from the clamped position when once set, and which is operated by a single handle moved in a counter-clockwise direction to release the tool block from its set or previously indexed position upon its center post and retaining means for holding the parts of the device in coupled relation, and by which the device may be readjusted or indexed to another position simultaneously with the actuation of the operating handle to release the block to permit the same to turn, and whereby the device may be set to any other desired angular position upon turning the same, after which it is only necessary to turn the operating handle in a clockwise direction to clamp the parts in the new set or indexed position.

Another object of the invention is to provide a novel cam means which is automatically released upon the handle being turned in a counter-clockwise direction for a short distance less than a complete turn and then by continuing the movement of the operating handle, to set the same in the desired angular position, whereas when the handle is turned in the clockwise direction to clamp the parts, the same automatically locks in the new or indexed position.

Another object of the invention is to provide means for accurately insuring proper indexing or adjustment of the angular position of the turret block and tools held thereby when turned for indexing, and to permit by one continuous motion of the operating handle, the release of the holding means which locks the parts and cooperating cams when the handle is turned to clamp the block in adjusted indexed angular position, together with a spring actuated detent to assist in the indexing in the different positions of adjustment.

Another object of the invention is to so construct the device as to permit it to freely move to the released and locked positions while being accurately indexed or set in any desired angular position by rotation of the operating handle and which by reason of the cam action provided, will be positively held in the locked position to clamp the block after being indexed or adjusted angularly, to prevent it from lifting, while allowing it to easily turn freely when the clamping means is released by the operating handle and then indexed in one motion of turning the handle.

Another object of the invention is to so construct the parts of the device that they may be readily and economically manufactured and assembled and maintain their positions for adjustment and indexing, comparatively indefinitely through numerous adjustments in operation, together with means for insuring proper assembly of the parts and of the center post constituting a part of the clamping means for locking the same to the base, whereby when the handle is in position, the securing means will be precluded from view and thereby act to discourage tampering or meddlesome disconnection or disassembly of the parts by inexperienced persons, thereby insuring that when the device is once assembled by an expert, it will accurately operate during its continual and ordinary use.

This application is a continuation in part of my prior application for patent for Tool Turret for Use on a Lathe, Serial No. 550,983, filed August 24, 1944, and now abandoned, and provides means for releasing and indexing the tool block and post by movement or swing of the operating handle in one direction instead of requiring that the tool block be separately manually adjusted by hand after release, and for tightening the device by swinging the operating handle in the opposite direction, and for preventing chips from interfering with the operation.

Other objects and advantages reside in the details of construction and operation as more fully hereinafter described and claimed, reference being had to the accompanying drawings forming part hereof, wherein like numerals refer to like parts throughout, and in which:

Fig. 1 is a perspective view of the assembled turret tool post.

Figure 3 is a central vertical sectional view of the assembled turret tool post with the handle shown in locked position.

Figure 4 is a bottom view of the tool block, showing the recess in the base thereof, and the conical depressions for indexing adjustment by means of the operating handle, and shown as 12 in number.

Figure 5 is a fragmentary detailed section on an enlarged scale, showing the cam actuating mechanism for the release of the indexing means upon turning the handle in a counterclockwise direction for angular adjustment to different positions.

Figure 6 is a sectional elevation partly broken away, of the assembled turret tool post and showing the handle in the released position of the device.

Figure 7 is a sectional view taken on the line 7—7 of Figure 6 and looking in the direction indicated by the arrows.

Figure 8 is a horizontal sectional view corresponding to Figure 7 but taken on the line 8—8 of Figure 6 and looking in the direction indicated by the arrows.

Figure 9 is a perspective view of one of the locating pins of convexly rounded or semispherical shape, and used in connection with the indexing means.

Figure 10 is a perspective view of another form of locating pin of conical form for the same purpose as the pin shown in Figure 9.

Figure 12 is a fragmentary sectional view of the upper part of the turret tool post, showing the use of a combination of cam and fine screw threads for the purpose of locking the tool block down on the three-point button or pin means, corresponding to the illustration of the form shown in Figure 3 of the drawings.

Figure 13 is a plan view of the device shown in Figure 12 with the operating handle removed.

Figure 14 is a detailed perspective view of the upper cam and ratchet.

Figures 2, 11:
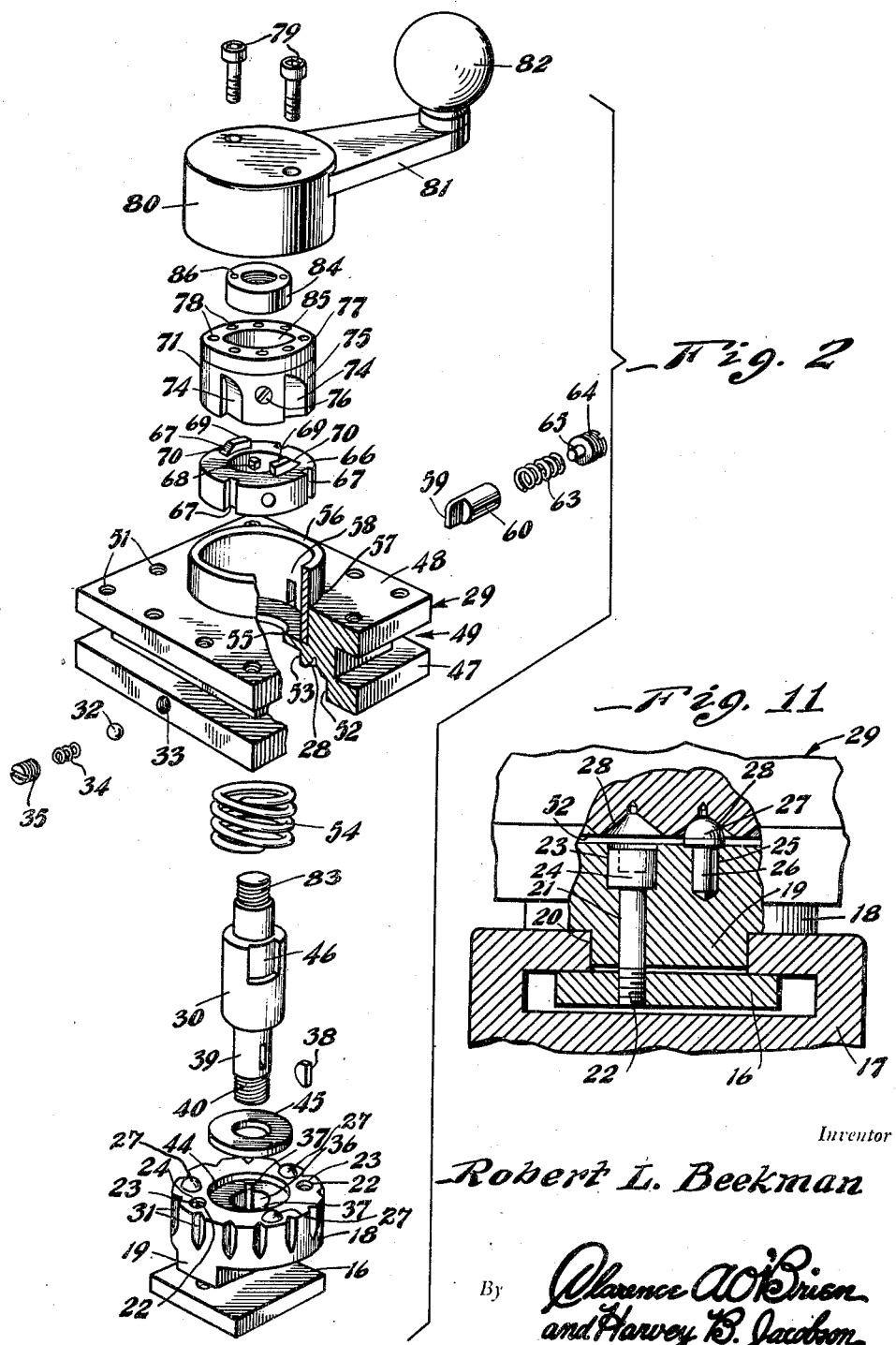
Figure 2 is an exploded or disassembled view of the turret tool post showing the various parts in perspective.
Figure 11 is an enlarged fragmentary sectional elevation showing the manner of securing the center post base in position and the relative location of the locating and indexing pin as applied to a turret tool post.

Referring to the drawings in detail, in which like reference characters designate corresponding parts throughout the several views, my indexing turret tool post is adapted for attachment to the cross-slide of the machine in the conventional manner, and comprises a lower clamping or base plate 16 designed to attach the turret to the machine in the conventional manner, as by means of the cross-slide 17 of the lathe or other machine, any approved method being employed. It is shown attached to the base 18 having the tongue or plate 16 at the bottom to fit in the T-slot of the machine at the cross-slide or otherwise. A reduced lower portion 19 is provided on the base 18 to enter the slot 20 of the turret lathe or cross-slide at the T-slot of the machine to be clamped therein as is well-known in the art. The plate 16 is spaced from the flattened reduced portion 19 and is secured in position by means of clamping and mounting screws 22 of the socket head type passed through holes 21 of the base 18, the enlarged heads 24 of said screws seating in enlarged portions 23 of the holes 21 below the upper surface of the base 18 and having hexagonal or other polygonal or equivalently shaped sockets as shown. The top of the base 18 is also provided with a plurality of equidistantly spaced sockets 25 receiving the reduced shank portions 26 of locating pins 27 having enlarged spherical or conical heads as shown in Figures 9, 10 and 11 of the drawings with their shoulders resting upon the top of the base 18 and the heads projecting upwardly therefrom. These sockets 25 and pins 27 are preferably three in number equidistantly spaced apart 120° and adapted to engage in a series of equidistantly spaced concentric conical indentations 28 in the bottom of a recess provided in the bottom face of a tool block 29, which indentations are a multiple of the number of sockets or seats 25 and pins 27, and shown as twelve in number spaced apart 30° from each other, to constitute divisions of positions to which the tool block may be adjusted angularly around its vertical axis or center and center post indicated at 30. As there are three of the headed pins to engage the conical indentations in the bottom recess of the tool block 29 circularly surrounding and clearing the periphery of the base 18 also of circular form, in spaced relation, a three-point suspension is provided which is absolutely steady, positive and will not wabble, in addition to providing clearance to prevent inoperativeness by the collection of chips or grindings of metal, with the space open at the bottom of the clearance, to render the same self-cleaning or discharging.

The periphery of the circular base 18 is provided with a plurality of equidistantly spaced, preferably twelve V-shaped slots or notches 31 around its rim or top portion adapted to be engaged by a spring detent or spring loaded ball 32, which is mounted in a radial opening 33 in the bottom of the tool block and biased or pressed in position by a spring 34 and held by a retainer screw or plug 35 threaded into the radial opening. The base 18 has a central bore 36 with multiple key-ways 37 running longitudinally, vertically or axially to receive a key 38 on the periphery of the reduced lower portion 39 of the post 30, which has its lower end threaded as indicated at 40 for engagement by a nut 41 seated in a bottom recess or depression 42 in the base 18 and having its bottom face above the bottom of the base said nut further having spanner or like sockets 43 to take a spanner wrench or other form of tool or key for turning or holding the same. The top of the base 18 is also provided with a concentric depression or recess 44 around the central bore therethrough to take a laminated shim or washer 45 at the key-ways 37 and above the same and the key 38 seated in a recess of the reduced portion 39 of the center post 30 which rests on the shim or washer adapted for vertical adjustment of the center post thereby. The center post 30 is also provided with a key-way or recess 46 opening into the upper edge of the enlarged central portion thereof which is of smooth cylindrical form.

The tool block 29 has upper and lower spaced flanges consisting of a lower flange 47 and an upper flange 48, through the former of which, the spring pressed or biased detent or ball 32 is mounted with a recess 49, between the flanges for receiving the tools or tool holders, which are clamped in position by socket head set screws 50 engaged through threaded bores 51 provided through and equidistantly spaced around the edges of the square of other desirably shaped tool blocks and shown as four in number on each side to extend into the recess 49 and clamp or hold the tools and tool holders in position along the sides of the tool block. The tool block 29 is also provided with a bottom circular cavity or recess 52 which rotatably fits over the top of base 18 with clearance therebetween. A further reduced circular cavity 53 is provided in the tool block inwardly of the indentations 28 and above the cavity 52 to take an expansible coil spring 54 around the enlarged portion of the post 30 to rest upon the shim or washer 45 and exert upward pressure against the top wall 55 of the cavity 53 which fits around the post 30 at a central opening in said wall 55. A sleeve 56 is seated in a circular recess 57 in the top of the tool block 29 within flange 48 thereof at its central body portion and constitutes an inner chip guard and guide with a vertical slot 58 therein to take the reduced flattened end portion 59 of a circular pawl 60 mounted in a horizontal radial bore 61 in the tool block 29 and extending through the adjacent edge of the flange 48 thereof as seen more particularly in Figures 3, 6 and 12 of the drawings. The outer end of the pawl 60 is hollowed out with a counter-bore 62 to take an expansible coil spring 63 held in position by a retainer screw or plug 64 having a reduced shank 65 engaging within and holding the spring 63 in position. The pawl 60 has its inner end made flat to slide freely in the slot 58 in the lower part of the chip guard or sleeve 56, and the spring 63 holds the flat end of the pawl engaged with a lower cam 66. A key 68 secured in cam 66 and engaged in the key-way 46 of the center post 30, allows angular rotation of a lower cam ring 66 thereon for an arc of 90°. The lower cam ring or cam 66, has four equidistantly spaced indexing slots 67 to receive the flat end of pawl 60, said slots being 90° and extending across the peripheral edge of said cam ring parallel to its axis. The top surface of the cam ring 66, is provided with spaced diametrically opposite cams 69 with inclined camming ends 70, while the top surfaces may be horizontally disposed or slightly inclined, the inclined angle, if employed, being very slight and preferably at about 2° or 3°. This is shown in Figures 3 and 5 of the drawings, or the same may be arranged horizontally perpendicular to the axis of the center post and cam ring, as well as parallel to the upper and lower surfaces of the ring, as shown in Figure 12 of the drawings.

Cooperating with the lower cam, is an upper cam and ratchet ring 71 having on the bottom thereof a pair of diametrically opposite cams or cam surfaces 72 opposing the cams 69 and inclined portions 73 disposed at the opposite ends with respect to the inclined cam surfaces 70 and either deviating from horizontal to the extent of 2 or 3°, or disposed horizontally, as previously described in connection with the cam surfaces 69 as shown in Figures 3 and 5 and Figure 12 respectively. The periphery of the cam and ratchet ring 71 is also provided with ratchet teeth formed by longitudinal tapered notches 74, 90° apart in the periphery thereof with beveled or inclined inner surfaces and radial end surfaces adapted to align with the slots 67 to receive the flat end 59 of the pawl 60 for locking the two cams together in one direction and for permitting the upper cam and ratchet ring to be turned independently of the lower cam ring, when lifted with the tool block by the spring 54. The upper cam includes a sleeve 75 held by a screw 76 and a top annular portion or flange 77 having a plurality of vertical threaded bores 78 for engagement by socket head screws 79 at diametrically opposite points of an operating handle and outer chip guard or sleeve 80, having an operating handle 81 with a gripping portion 82, disposed over the upper cam, and terminating in spaced relation to the top surface of the tool block 29, as particularly shown in Figures 1, 3 and 12 of the drawings. The purpose of the sleeve 75 is to stamp the same with the ratchets or notches 74 or to fit the same over similar cut-outs in the lower reduced cylindrical portion of the cam 71, so that the cam teeth or portions 72 may be formed to extend below the bottom surface thereof, while the sleeve 75 extends down to cooperate with the slots 67 adjacent the top of the cam surfaces 69, so that the pawl or latch 60 may cooperate therewith at its vertical flat inner end, to slide in the slot in the lower part of the chip guard or sleeve 56 and connect or span the two cams by bridging the space between the lower cam ring 66 and the sleeve 75, and thus connect the two cams 66 and 71 when the cam surfaces ride off one another, and to separate the two cams when they are riding on one another, as shown in Figures 3, 5 and 12, to lower the tool block 29 against the action of the spring 54 and cause the pawl 60 to engage only the lower cam ring 66, as seen in Figures 3 and 12, in the locked position with the tool block down, so that the pins or buttons 27 will engage the indentations 28, as distinguished from the disengaged, inoperative or released position for indexing, as shown more particularly in Figure 6, when the tool block 29 is raised by the spring 54 to disengage the indentations 28 from the pins 27 for turning and indexing the tool block and tools carried thereby by turning the handle 81 in a counter-clockwise direction first to disengage by means of the cams and then to turn the tool block in a single continuous movement in the same direction with the cams 69 and 72 riding off of each other to permit the tool block to raise in the related position upon counter-clockwise movement of the handle, and then upon clockwise movement thereof in the opposite direction, to cause the cams to ride on each other and depress the tool block into engagement with the pins 27 at the depressions 28. In raised position, the pawl 60 will span or overlie the slots 67 and ratchet notches 74, so as to connect both of the cams or rings 66 and 71. This is possible, because the upper cam assembly 71 is threaded directly on the upper threaded portion 83 of the center post 30, which is the upper reduced end portion thereof, and forms a clamping nut as well, in the form shown in Figure 12, or a nut 84 in the form of a ring, is employed in the construction shown in Figures 2 and 3, threaded on the reduced upper end 83 and seating in a recess 85 in the top of the cam 71 and provided with sockets 86 for a spanner wrench or the like to hold the upper cam as well as the other parts in assembly, with the upper cam fitting on a smooth cylindrical reduced portion of the center post 30 and supplemented by the nut, instead of the cam serving also as a nut and clamping means to hold the parts in assembly in the form shown in Figure 12. In the latter form, the riding top surfaces of the cams are arranged parallel and horizontal perpendicular to the axis of the center post, so that the inclined ends 70 and 73 serve as camming surfaces to separate the cams in the locked position as shown in Figures 3 and 12, with the tool block engaged and seated upon the pins 27 at the indentations 28, in which the tool block and tools or holders carried thereby, are held against movement and in accurate adjusted positions. It should also be noted that the hardened sleeve 75 around the reduced lower portion of the upper cam extends by means of an upper peripheral flange perpendicular thereto as indicated at 87, or omitted entirely, and also that the nut 84 may be keyed to the fine threaded portion 83 of the center post 30 to lock the nut thereto, if desired. Also, the detent 32 may be of any other suitable form such as a tapered pin to cooperate with the notches 31 in the base 18. This also serves as an audible indicating means of the proper indexing as the spring pressed detent snaps into the ratchet notches for any adjustment or number of notches desired to determine the angle or degree or turning. Thus, the device or turret tool post may be used on a lathe, turret lathe, screw machine, boring mill or other similar machine tool, which shall be capable of rapidly and accurately indexing and presenting various tools to the work, requiring the use of only one hand for its operation and embodying a device which requires only small relative angular movement of the handle in unlocking, indexing and relocking of the tool block, with extremely fast operation due to the small angular movement of the handle and due to the indexing feature described, with extreme accuracy of indexing due to the design of the cams and indexing mechanism and positive seating of the tool block on the locating pins in a steady position. In addition, the tool block is tightly clamped with a minimum of manual exertion due to the design of the locking device and the use of fine pitch screw threads on the center post in any one of the twelve or more angular positions, thus giving three positions or more for each tool depending upon the number of pins and indentations cooperating therewith. The design also permits rapid detachment or removal from the machine and the construction is such as to effectively prevent entrance of foreign matter into the working parts with clearance where needed. The device also consists of relatively few parts, which are of ample proportions and construction and do not contain any weak or delicate parts and the design is such as to insure long and accurate life, due to provision being made to effectively compensate for any wear that may develop. The device is also of simple and of pleasing appearance and easy and cheap to manufacture due to simple design of all the parts and absence of complicated machining operations, provision being made for attaching the operating handle in any desired angular position and for mounting a turret tool post in any required angular position with respect to the actions of the spindle of the machine tool on which it is used. The upper combination cam assembly also serves as a combined cam and ratchet and the key-way in the center post allows annular rotation of the lower cam ring 90°. With the sloping end portions of the cams serving to permit separation or moving together of the parts and cams as well as the locking and releasing of the tool block with respect to the locating pins and indentations in the base recess of the tool block, assisted by the inclined top surfaces of the cams or the parallel horizontal surfaces thereof at right angles to the axis of the center post. In other words, either form may be used with equal facility though the form shown in Figure 12 is slightly more simple and practical of the two methods, although they may be used as alternatives. The laminated shim or washer, is especially desirable for the purpose of adjusting the vertical height of the center post, which provides compensation for any wear taking place in the cams or other parts of the device. The three conical or spherical buttons or locating pins, accurately locate the device in connection with the ratchet arrangements, and the turret block is always in its correct angular position when adjusted, in addition to being supported upon a three-point support, thereby insuring extreme accuracy in the indexing and adjustment. In this way, the locating pins or buttons serve additionally as a support, as well as a locating means for the turret or tool block, as distinguished from the prior art and insuring the correct angular position thereof and the tools or tool holders carried by the block. Also, the adjustment means, obviates the necessity of first releasing the turret or tool block and then indexing the same into a new position by hand, whereas with my device, the turret is indexed by the rotation of the handle in one direction continuous and in the same direction with the direction of release and then is locked in the reverse direction in a simple and efficient manner. The indentations 28, may be semi-spherical to mate with the semi-spherical pins or locating buttons, or conical as described, which are also adapted for use with the conical pins or buttons. Also, no combined screw and cam action is required with the present device and with the construction and arrangement of the cams as described. In other words, the upper cam may be threaded directly on the fine threads of the reduced upper portion of the center post 30, or because of the compound cam arrangement employed, a simple nut may be employed for securing the cam on the post as described. In this form, by having the cams or cam surfaces 69 and 72 at a slight angle of 2° or 3°, instead of perpendicular to the axis of the center post and horizontal, the tool block is locked down tightly on its buttons or locating pins by a movement of the upper cam in a clockwise direction, while the nut merely holds the upper cam in place, preventing it from lifting, but allowing it to turn freely, with the nut held by a key or pin from unscrewing, as will be obvious. In each instance, the handle is held in position at its center hub or cap, by means of cap screws or the like, the center cap or hub operating as an outer chip guard effectively cooperating with the lower chip guard and guide for the pawl 60. Also, it is pointed out that the upper cam fits freely on the upper cylindrical portion of the center post, permitting ease of movement and adjustment. The use of a simple and single spring construction eliminates the use of several springs with or without plungers or other complicated spring means to raise the tool block as heretofore employed in the art.

Figure 15:
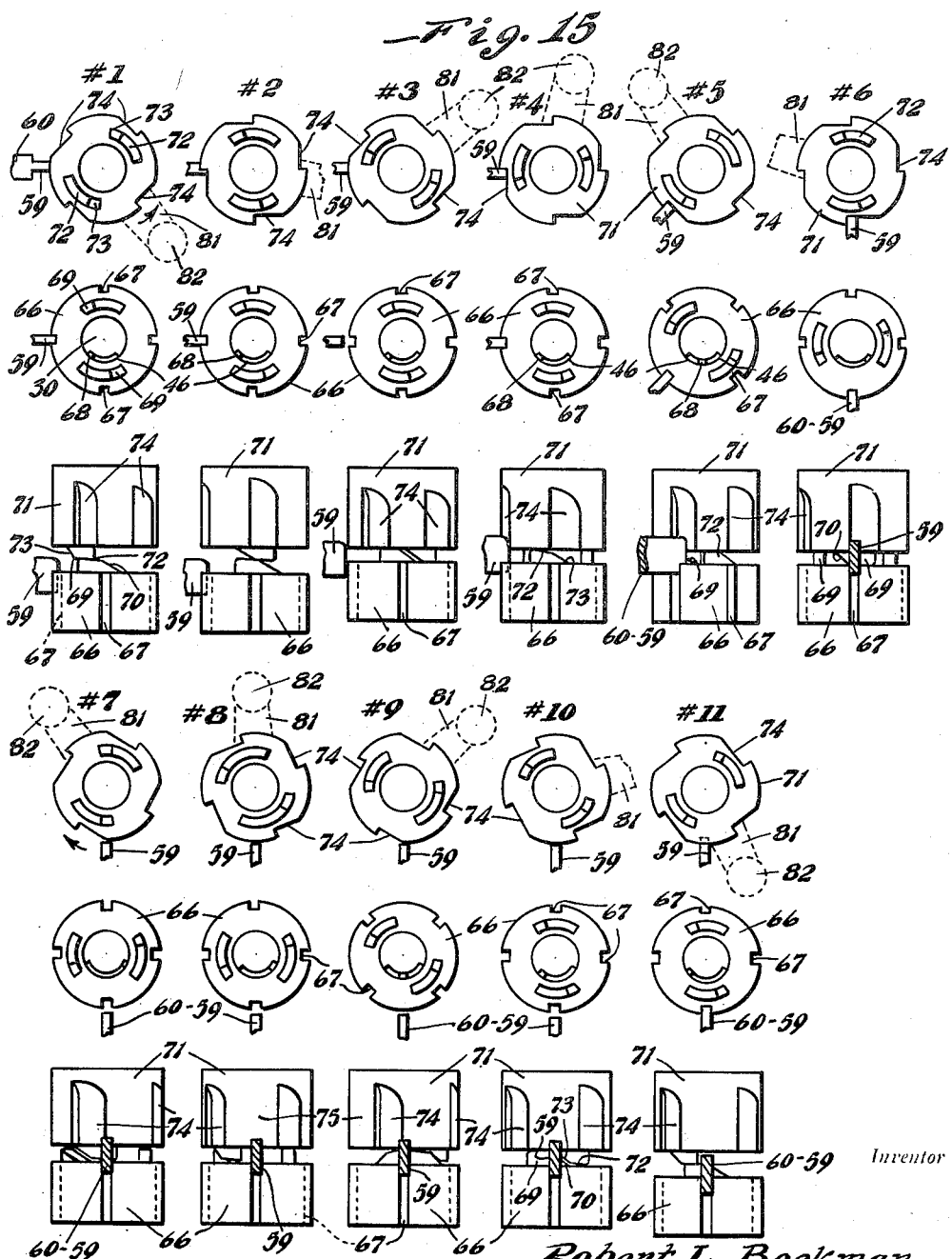
Figure 15 is a series of diagrammatic views illustrating in positions #1 to #6 inclusive, the sequence of operation of the locking and indexing mechanism, from the fully locked position, to the unlocked and indexed position, and in positions #7 to #11 inclusive, the sequence of operation of the locking and indexing mechanism from unlocked and indexed, back to the fully locked position.

In the positions of the device shown in Figure 15, the operation of the locking and indexing device is illustrated, with the operating handle indicated in dotted lines, the upper cam and ratchet in top elevation, looking down from the top, the lower cam looking down from the top, the center post in its relative positions together with the pawl or latch, key in the lower cam ring, the key-way in the center post, allowing angular rotation of the lower cam ring 90°, and the representations of the low sections of both cams, the said sloping sections of both cams and the high sections of both cams. Referring more especially to the positions in Fig. 15, #1 to 6 inclusive, in position #1, the various parts are shown in the fully locked position with the handle swung clockwise to its limit as in Figures 3 and 12. It will be seen that in this position, the high sections of both cams are in contact, forcing the lower cam downward, aided by the fine thread on the top of the center post engaged by the upper cam or clamping nut in the form of a ring nut as shown, and locking the tool block securely down on its base, aligned by the tapered locating pins, either conical or spherical as described, forming buttons when in position and seating in the tapered indentations 28 or corresponding hemispherical indentations. In this position, it will be noted that the lower cam is turned clockwise as far as it can go, and the key 68 bears against the left-hand side of the key-way 46 and the end 59 of the pawl 60 is seen engaged in the notch or slot 67 of the lower cam or cam ring 66, but is not in contact with the upper cam 71 and is in spaced relation thereto.

In position #2, the operating handle or lever 81 has been moved slightly counter-clockwise approximately 45°, and the action of the upper cam nut or upper cam on the screw threads 83 has been loosened slightly, and the cams are shown at the instant of starting to release with the top of the cam surfaces starting to ride on each other.

In position #3, the handle has been turned still further to the left approximately 45° and the action of the cams has allowed the spring 54 to push the tool block 29 upward, carrying the upper cam and pawl 59—60 with it, while also pushing the pawl 60 outwardly or back by the action of the upper ratchet 74 and the upper cam bearing against the bevelled top corner of the pawl 60.

In position #4, the handle has been turned slightly more to the left, and in this position, the pawl 60 has been allowed to drop into the notch or groove 67 of the lower cam 66 adjacent thereto and the corresponding ratchet notch 74 of the upper cam 71 due to the action of the spring 63. This relation of parts is shown clearly in Figure 6. Also, in position #4, the handle 81, upper cam 71, lower cam 66 and tool block 29 are mechanically locked together by the pawl 59—60 being seated in the notches 67 and 74. However, tool block 29 has been lifted clear of the indexing or locating pins or buttons of semihemispherical or conical form 27, whichever are used and is only held from turning by the friction of the detent or ball 32 engaging in the notches 31 of the base 18. It will also be noted that in position #4, the vertical sides of the lobes of the cams 71 and 66 at the cam surfaces 72 and 69 are in contact, so that any further movement of the cam 71 to the left, will result in an equal amount of movement of cam 66 in the same direction, which movement will be communicated to tool block 29 by means of the pawl 59—60 being engaged in slots 67.

In position #5, the handle 81 has been turned approximately 45° further to the left than it was in position #4, thereby rotating the cams 71 and 66 the same amount, rotating the tool block 29 due to the engagement of the pawl 59—60 in the slot 67. In this position, the key 68 has moved to the left and is now approximately in the center of the key-way 46.

In position #6, the handle 81 has been turned still further to the left and key 68 has moved counter-clockwise until further movement is prevented by coming into contact with the right hand side of the key-way 46. Since cam 66 and tool block 29 are mechanically locked together by the engagement of the pawl 60 in the slot 67, it is impossible for the inertia of the moving tool block 29 to carry it around any further, and no matter how fast the handle has been turned, in indexing the tool block, it cannot turn past this point. It will be clearly seen that the mechanical contact of the key 68 and the right hand side of the key-way 46 positively prevents any further movement of the cams 71 and 66, handle 81 or tool block 29, in a counter-clockwise direction. Also, in this position, the tool block 29 has been released and indexed 90°, although it may be set in any other angular position, in a counter-clockwise direction, from its original locked position as shown in position #1. This has been accomplished by an angular movement of the handle in a left-hand or counter-clockwise direction thereof, of approximately 240°, but it is understood that any other angular position may be secured, with a difference of 30° in each position of the locating and indexing pins.

As distinguished from the releasing and indexing positions shown in positions #1 to #6 inclusive, in position #7, the handle 81 has moved clockwise or in the opposite direction a slight amount, causing the ratchet notch 74 in the upper cam 71 to push the pawl 59—60 against the action of the spring 63 outwardly, causing said pawl to clear the slot 67 in the lower cam ring 66. During this and subsequent motion of the handle, tool block 29 is held motionless and in perfect alignment by the engagement of the spring-loaded ball or detent 32 in the proper aligning notch 31 of the base or turntable 18.

In position #8, the handle 81 has been turned still further to the right, the position of the handle being indicated in dotted lines in each instance, pawl 60 is riding on the cylindrical section of ratchet 74, and since no movement of the lower cam 66 has taken place, the inclined or sloping portions 70 and 73 of both cams are now in contact at the top or adjacent ends thereof. Thus, it is evident that any further clockwise rotation of the cam 71 will result in an equal amount of rotation of the cam 66.

In position #9, the handle 81 has been moved about 45° further to the right or clockwise, and it will be seen that the cam 66 has moved an equal amount in the same direction, and that key 68 in cam ring 66 is now approximately in the center of the key-way 46 of the center post 30.

In position #10, the handle 81 has been moved further in a clockwise direction to the right, rotating the cams 66 and 71 with it, and in the position advanced further to the right as shown, key 68 is now in contact with the left-hand side of the key-way 46 in the center post 30, preventing any further clockwise rotation of the cam 66. This position is also shown in Figure 6. Since further rotation of the cam ring 66 is impossible, further rotation of the handle 81 and the upper cam 71 results in pushing the cam 66 downward against the action of the spring 54, carrying the tool block 29 with it and locking the tool block firmly down on the tapered or conical buttons or locating pins 27. This is shown in position #11, which is the same position as in position #1, except with respect to the location of the pawl 59—60, and is also shown in Figure 6. Since the high sections 69 and 72 of the cams or camming surfaces proper, are now in contact, as in position #11, and as these surfaces are inclined or at a slight angle of 2 or 3°, or plain and at right angles to the axis of the center post 30, any further clockwise rotation of the handle 81 results in further tightening-down of the tool block 29 by the action of the fine threads 83 or the ring nut 84 in the first form, or of the direct threaded connection of the upper cam assembly 71 with said threads in the second form, on the center post 30 due to the position 77 being internally threaded for receiving the ring nut 84 for engagement with the threads 83 of the center post 30. The real function of the cams 66 and 71, therefore, is to rapidly depress or release the tool block 29 with a relatively small angular movement of the handle 81, while the actual tightening-down is done by the fine-pitched screw threads 83 by movement of the handle in a clockwise direction to the right in Figure 15, as distinguished from the releasing and indexing position in a counter-clockwise direction or to the left, as described above, or the direct camming action in Figures 1, 3 and 6.

It is also apparent that when so desired, the tool block 29 may be rapidly spun or indexed by hand, by moving the handle 81 to approximately the position shown in position #8, which permits the manual rotation of the tool block 29 to any of the twelve positions indicated, when it may be clamped and locked by turning the handle 81 to the right. In a turret tool post of this type, it is sometimes desirable to rapidly index the tool block 29 twice or more in succession, as for instance when only two tools are being used. By moving the handle 81 from the position #4 to the position #6 and back to the position #4, the tool block 29 is indexed 90° with a 90° movement of the handle 81. When the tool block 29 has been indexed in this manner, the desired number of times, the handle 81 is turned to the right to the position #11, thus locking the tool block 29 in the position to which it is adjusted and indexed. While the normal operation consists of indexing tool block 29, 90° each time, it is sometimes desirable to index 30° or 60° from the normal position. By turning the handle 81 to the left until the tool block 29 has moved to the desired amount as indicated by the feel of the detent or ball 32 dropping into the proper aligning notches 31, in the base or turntable 18, and then turning the handle 81 back to the right, it will be seen that the tool block 29 can be readily used in any of the twelve angular positions. For instance, when mounted on the compound rest of a lathe, it is sometimes necessary to have the compound rest set at various angles to the axis of the lathe spindle, and still have the normal locked position of the tool block 29 parallel to the axis of the lathe spindle. This condition is met by the use of several key-ways 37 in the base or turntable 18 at the bore 36, so that the center post 30 by means of the key 38 may be turned to the desired angular position and locked in place by the key, which also fits the key-way or slot in the center post in the lower reduced portion 39 confined between or spaced from the ends thereof and the threaded portion 40 with respect to the enlarged cylindrical portion proper of the center post 30.

Provision for wear in the screw threads 83 or cams 66 and 71, or the cams or cam surfaces proper, 69, 70, 72 and 73 is made by the use of the laminated washer or shim 45. When wear occurs, removing one or more layers of the laminated shim or washer 45 will compensate for such wear so that when tightly locked, the cams 66 and 71 are in their proper position as shown in Figure 6. On the other hand, positions of the parts shown in Figures 3, 11 and 12, show the tool block held thereon and adjusted in an indexed or desired angular position with the identations 28 receiving the hemispherical or conical pins and holding the tool block and tools steady in a three-point support. Also, on a turret tool post, it is often desirable to have the handle 81 in a certain position, so that it will not be in the way of other tools used on the machine. This is provided for by having a series of holes 78 in the top of the cam assembly 71 so that the handle 81 may be attached in a number of different positions by means of the cap screws 79 which I have shown as socket head screws having hexagonal sockets or other polygonal-shaped sockets for this purpose engaged by the usual form of socket wrench or tool. Provision for preventing the entrance of chips, dirt or other foreign matter is also made by providing the inner chip guard or guide for the pawl 60, as indicated at 56, which is surrounded and covered by an outer chip guard 80 forming the sleeve or hub of the handle. Also, the recess 52 in the bottom of the tool block, being a close fit on the turntable or base 18, prevents the entrance of foreign matter from the bottom. While the drawings show a square or four-sided tool block, I do not desire to be limited to this particular construction or geometrical shape, since it is evident that the tool block can be made of any suitable poly-sided form, such as three, four, five or six sided and can be made to index any desired number of times per revolution with the proper number of locating pins and the proper multiple thereof of the indentations, providing the cams 66 and 61 and their cam surfaces are properly proportioned and the required number of notches 74 and 31 and indexing slots 67 are provided in said cams. Also, the key-way 46 is made to allow the correct angular movement of the cam ring 66. Furthermore, I do not limit my invention to the employment of the particular method shown for locating the turret, i. e. the employment of three conical or hemispherical buttons or pins spaced apart 120° in the base or turntable 18 and seating in three of the twelve conical depressions or seats shown in the recess in the underside of the tool block, for as before stated, any suitable number may be employed, as long as the number of indentations is a multiple of the number of pins or locating buttons. Thus, such constructions are therefore comprehended within the scope of the invention without limitation thereto, as long as the same embody the constructional principles of operation and arrangement of parts included within the scope of the description and illustration.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. An indexing turret tool post comprising a base, a post projecting upwardly from the base, a block having a top recess and a bottom recess receiving the base for rotation thereon, means on the block for receiving and holding tools or tool holders, means cooperative between the block and the base for determining angular position of turning of the block on the base, a multiple-point locating and supporting means on the base, said block having a plurality of indentations at the bottom of its bottom recess, the number of which is a multiple of the number of point contacts for engagement of the latter in equidistantly spaced indentations upon angular adjustment of the block, there being a space or clearance between the top of the base and the bottom of the recess in the block, co-acting upper and lower camming members having peripheral notches and mounted on the post and seated within the top recess of the block, locking means carried by the block engageable within the peripheral notches in said camming members simultaneously, a spring on the post between the base and the block tending to elevate the block, and handle means on the upper end of the post to relatively turn said camming members in one direction and press the block down against the action of said spring to disengage said locking means from the upper cam member and cause the contact support means to engage in the indentations and to relatively turn said camming members in the opposite direction to allow the spring to raise the block above the contact supports.

2. An indexing turret tool post comprising a base, a post projecting upwardly from the base, a block having a top recess and a bottom recess receiving the base for rotation thereon, means on the block for receiving and holding tools or tool holders, means cooperative between the block and the base for determining angular position of turning of the block on the base, a multiple-point locating and supporting means on the base, said block having a plurality of indentations at the bottom of its bottom recess, the number of which is a multiple of the number of point contacts for engagement of the latter in equidistantly spaced indentations upon angular adjustment of the block, co-acting upper and lower camming members having peripheral notches and mounted on the post and seated within the top recess of the block, locking means carried by the block engageable within the peripheral notches in said camming members simultaneously, a spring on the post between the base and the block tending to elevate the block, and handle means on the upper end of the post to relatively turn said camming members in one direction and press the block down against the action of said spring to disengage said locking means from the upper cam member and cause the contact support means to engage in the indentations and to relatively turn said camming members in the opposite direction to allow the spring to raise the block above the contact supports, said handle means including a handle threaded on the upper end of the post and extending over the upper camming member, a chip guard and guide sleeve under the handle means and extending down into the top recess of the block to receive the locking means of the camming members therethrough.

3. An indexing turret tool post comprising a base, a post projecting upwardly from the base, a block having a top recess and a bottom recess receiving the base for rotation thereon, means on the block for receiving and holding tools or tool holders, means cooperative between the block and the base for determining angular position of turning of the block on the base, a multiple-point locating and supporting means on the base, said block having a plurality of indentations at the bottom of its bottom recess, the number of which is a multiple of the number of point contacts for engagement of the latter in equidistantly spaced indentations upon angular adjustment of the block, co-acting upper and lower camming members having peripheral notches and mounted on the post and seated within the top recess of the block, locking means carried by the block engageable within the peripheral notches in said camming members simultaneously, a spring on the post between the base and the block tending to elevate the block, and handle means on the upper end of the post to relatively turn the camming members in one direction and press the block down against the action of said spring to disengage said locking means from the upper cam member and cause the contact support means to engage in the indentations and to relatively turn said camming members in the opposite direction to allow the spring to raise the block above the contact supports, said handle means including a nut carried by the upper camming member and threaded on the upper end of the post, and a handle attached to the upper camming member.

4. The construction defined in claim 3, wherein the lower camming member has peripheral slots axially of its edge, and wherein the upper camming member has ratchet notches serving as stop means in one direction of rotation of the upper camming member with respect to the locking means.

5. The construction defined in claim 3, wherein said center post has a peripheral recess, a key on the lower camming member engaging said recess to limit the turning of the lower camming member and block with respect to the post when said block is locked to the lower camming member, said block being turnable to index the same angularly by one direction of movement of the handle means on the upper end of the post in a single direction, first to release the same and then to turn the block and adapted to be clamped by opposite rotation to seat the block upon the multiple contact means.

6. An indexing turret tool post, comprising a base forming a turntable, a center post angularly adjustable therein, means to secure the post in the base, said base having a plurality of equidistantly spaced peripheral notches, seats in the top of the base, a plurality of equidistantly spaced locating and seating pins engaged in said seats, a tool holding block having tool engaging means and having a bottom recess fitting over and rotatable on the base, a spring pressed detent carried by the block and engaging said notches, the bottom of the recess of the block having tapered seats engageable by the pins, said seats being a multiple of the number of pins, said block having a reduced recess communicating with the first-named recess around the post, a spring in the latter reduced recess and having adjustment means between the same and the base, said spring tending to elevate the block, means co-acting between the block and the post to limit the turning of the block including a lower camming member keyed to the post for limited rotation relative to the latter, an upper camming member on the post, said camming members having axially exending peripheral notches and provided with co-acting cam surfaces with oppositely sloping ends adapted to move into and out of engaged position to depress the block onto the pins or to permit raising thereof above the pins, said block when raised above the pins adapted to be turned for angular adjustment, a spring pressed pawl carried by the block and engageable in the axially extending peripheral notches in the camming members when the block and lower camming member are raised, a nut threaded on the upper end of the post, and a handle member secured to the upper camming member to turn the latter on the post to simultaneously release the lower camming member and the block for raising movement and to index the same with one hand in a single stroke in the same direction, and adapted upon turning the same in the opposite direction, to cause reverse action thereof to lower the lower camming member and the block to seated position in indexed adjusted position angularly.

7. In an indexing turret tool post, a base, a post adjustable therein and projecting thereabove, said base having peripheral notches equidistantly spaced apart, a block having a recess engaging over said base and provided with a spring-pressed detent to engage said notches to locate the block with respect to the base, means between the post and base for adjusting the same for wear, a spring surrounding the post and engaging the block to normally hold the latter upwardly, upper and lower cam members having coacting oppositely inclined cam surfaces and mounted on the post, a spring-pressed pawl carried by the block and engaging peripheral notches in said camming members when the block and lower camming member are raised, said lower camming member, block and detent being movable to engage the detent with or disengage it from the upper camming member, a handle having a chip guard depending therefrom, a chip guard and guide sleeve around the camming members in the block and receiving the aforesaid chip guard thereover and the pawl therethrough, said handle having threaded connection with the upper end of the post for raising the same and releasing the block to move upwardly with the lower camming member when the handle is turned in one direction and to force the same downwardly when turned in the opposite direction for clamping the block against turning.

8. An indexing turret tool post comprising a circular base having an upstanding post, said post having a finely threaded upper end, a plurality of locking pins mounted in and projecting upwardly from said base, a turret tool block rotatably mounted on said base and said post, said tool block having a plurality of sockets in its lower face for selective reception of said locking pins, constantly operative non-positive detent means for holding the tool block against rotation relative to said base, a spring interposed between the base and the tool block for elevating the latter out of engagement with said locking pins, a ring disposed on said tool block and mounted on said post for vertical movement and limited rotation relative to the latter, said ring having transverse peripheral slots and being provided with top cams, a nut adjustably threaded on the upper end of said post, said nut having transverse peripheral ratchet teeth and being provided with bottom cams coacting with the cams of said ring to allow said spring to quickly elevate the tool block out of engagement with the locking pins when the nut is turned in one direction and to quickly depress the tool block into engagement with said pins when the nut is turned in the opposite direction, and a spring-pressed pawl carried by the tool block and simultaneously engageable in a slot of the ring and with a ratchet tooth of the nut to cause turning of the tool block in one direction when the latter is elevated and the nut is turned in the same direction, said ratchet teeth acting to release the pawl from the slots of said ring when the nut is turned in the opposite direction with the tool block elevated, said cams acting to disengage said pawl from said ratchet teeth upon depressing the ring and tool block when the nut is turned in said opposite direction, whereby the nut may be finally threaded down on the post to tighten the engagement of the tool block with the locking pins and initially threaded up on the post to loosen such engagement.

9. The construction defined in claim 8, wherein said tool block has a top recess in which said ring is seated and concentric bottom recesses respectively receiving the base and the spring.

10. The construction defined in claim 8, wherein said tool block has a top recess in which said ring is seated and concentric bottom recesses respectively receiving the base and the spring, and telescoped chip guard sleeves respectively carried by the tool block and the nut.

ROBERT L. BEEKMAN.

REFERENCES CITED

The following references are of record in the file of this patent:

UNITED STATES PATENTS

| Number | Name | Date |
|---|---|---|
| 462,160 | Rihl | Oct. 27, 1891 |
| 1,474,438 | Muller | Nov. 20, 1923 |
| 2,335,712 | Vitale | Nov. 30, 1943 |
| 2,355,072 | Honegger | Aug. 8, 1944 |
| 2,358,816 | Mark | Sept. 26, 1944 |

FOREIGN PATENTS

| Number | Country | Date |
|---|---|---|
| 29,328 | Norway | Jan. 6, 1919 |